United States Patent [19]

[11] 3,744,310

Battistoni et al.

[45] July 10, 1973

[54] POSITIONING DUAL RECORD CARDS IN A COMPOSITE PUNCH/READ STATION IN COORDINATION WITH KEYING OF SOURCE INFORMATION TAKEN FROM PORTIONS OF THE CARD WHICH MAY BE OBSTRUCTED BY STATION COMPONENTS

[75] Inventors: Richard B. Battistoni, Pleasant Valley; John Lettieri, Woodstock; Donald L. Pierce, Hyde Park; Walter J. Weikel, Wappingers Falls, all of N.Y.

[73] Assignee: International Business Machines Corporation, Armonk, N.Y.

[22] Filed: Oct. 29, 1971

[21] Appl. No.: 193,899

[52] U.S. Cl. .................... 73/156
[51] Int. Cl. .................... G07c 11/00
[58] Field of Search .................... 73/156; 234/17

[56] References Cited

UNITED STATES PATENTS

| | | | |
|---|---|---|---|
| 2,684,719 | 7/1954 | Johnson et al. | 234/17 |
| 3,348,411 | 10/1967 | Roe | 73/156 |

*Primary Examiner*—S. Clement Swisher
*Attorney*—Robert Lieber et al.

[57] ABSTRACT

Dual record cards (i.e., cards including provision on respective surfaces for containing printed or written source data intended to correspond to information punches of the same card) are subjected to dynamically coordinated escape positioning and process handling (e.g., reading and verification) in a composite Punch/-Read process station. Card positioning and station processing operations (e.g., verification read-sensing of pre-punched card data) are dynamically coordinated with viewing and keying operations conducted with respect to source data writings contained on respective card surfaces. Coordination is achieved through program information pre-loaded into the system buffer store. Such information interrupts automatic card escapement at appropriate intermediate column processing position(s) relative to the station, whereby the key operator is given an unobstructed view of source data on the card which is subject to being obstructed otherwise and which is requisite to continuation of process handling. Escapement is permitted to resume thereafter only upon completion of a number of valid key entry manipulations related functionally to the column processing position of the card at interruption.

8 Claims, 18 Drawing Figures

INVENTORS
RICHARD B. BATTISTONI
JOHN LETTIERI
DONALD L. PIERCE
WALTER J. WEIKEL

BY Robert Lieber
ATTORNEY

PATENTED JUL 10 1973 3,744,310

SHEET 03 OF 13

PATENTED JUL 10 1973 3,744,310

SHEET 07 OF 13

CYCLIC (BUFFER STORE) TIMING

BASIC ESCAPE TIMINGS

BASIC READ TIMINGS

POSITIONING DUAL RECORD CARDS IN A COMPOSITE PUNCH/READ STATION IN COORDINATION WITH KEYING OF SOURCE INFORMATION TAKEN FROM PORTIONS OF THE CARD WHICH MAY BE OBSTRUCTED BY STATION COMPONENTS

CROSS-REFERENCE TO RELATED APPLICATIONS

Copending U.S. Pat. application Ser. No. 158,343 by F. T. Kendall et al. for "Step Motor and Controls For Non-Oscillating Punch/Read Positioning of 80-Column Record Cards" filed June 30, 1971.

BACKGROUND OF THE INVENTION

This invention pertains generally to coordinated handling of viewing, keying and escape positioning functions, in relation to dual record cards, during processing of such cards in a buffered keypunch system. A dual record card is one including provision on a surface thereof, which is visible during Punch/Read handling, to contain written or printed source data (e.g., sales information prepared by salesmen) intended to correspond to information punches of the same card.

Typically such dual cards are set up and held in a predetermined initial viewing and keying position before being fed into punch or read stations; as described for example in U. S. Pat. No. 2,684,719 granted July 27, 1954 to R. B. Johnson et al. With the card so positioned the operator may view source information and operate corresponding keys to transfer corresponding information into a system buffer store. Upon operation of a release key the card is released for alignment, escapement and process handling relative to a process station (in the Johnson et al. patent this would be the punching station).

However, if space relative to the process station is at a premium it may be inconvenient and inefficient to set up the cards initially in this fashion. Also, with such initial set-up and keying there may be a significant time delay between the last key entry and the movement of the card into and through the process station. Another disadvantage is that if some of the information to be keyed is taken from source documents other than the dual card it may be wasteful of process time to hold the card stationary while keying is in process.

Accordingly, an object of the present invention is to provide for efficient and dynamically coordinated control of escape positioning of dual cards relative to a process station during a keying process; in order to preserve visibility of source information on the card which is subject to being obstructed by the station absent such coordination and which is requisite to the keying process.

Another object is to provide for program controlled dynamic coordination of positioning, viewing and information keying operations relative to dual cards in a process station.

A particular object is to provide an improved verification keying system for verifying pre-punched dual record cards.

A related particular object is to provide for coordinated card escapement, card punch sensing and source information re-keying in respect to verification of pre-punched dual record cards; particularly, where the information for re-keying is derived partly from written information on the card and partly from a source document separate from the card.

An associated object is to provide for verification keying while a dual card containing a portion of the keying source information is undergoing escapement through a read station which obstructs viewing of such source information at certain escapement positions of the card.

An ancillary object is to provide for coordinated interlocking of a keyboard and an escapement unit, in a verification keying system for dual cards, whereby the keys may be operated while an initial field of information punch columns on a dual card is being sensed and transferred to a buffer store while the card is being stepped (escape positioned) at high speed relative to a read-sensing station and to provide for optional programmed interruption of such movement when the card arrives at a position in which source information on the card surface is requisite and conveniently viewable for keying only in the instantaneous position of the card in the station.

Other particular objects are to provide specifically for control of operator correction of incorrectly punched dual cards detected by the above verification procedure; said control including automatic punching of a non-dual blank card from a complete 80 column field of verified information assembled in the store during dual card verification.

The foregoing and other features, aspects and objectives of the present invention may be more fully understood and appreciated by considering the following description and claims.

Figure 5:
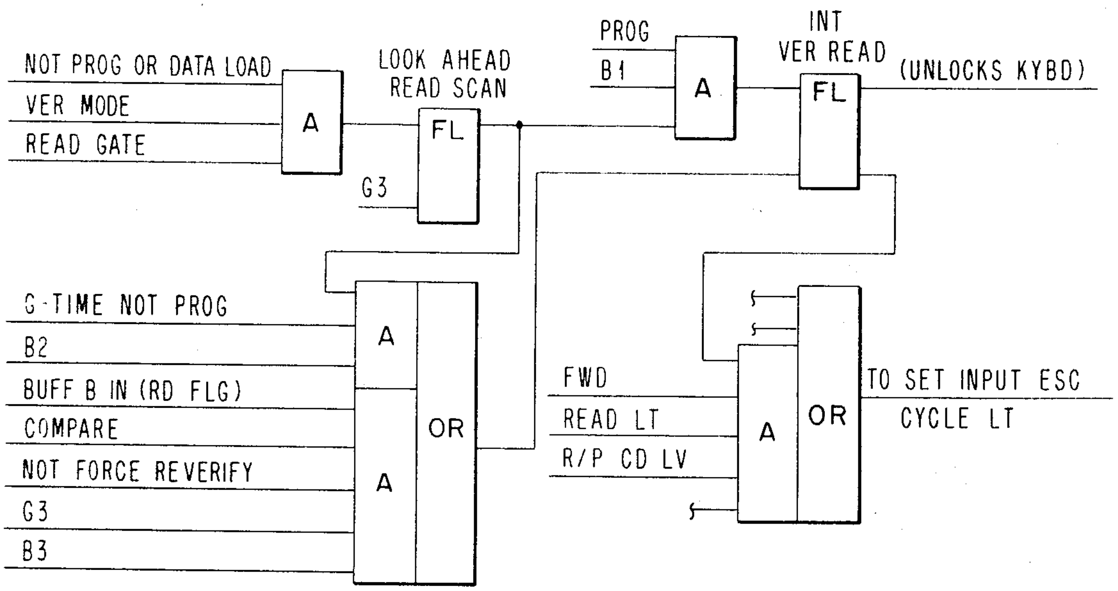
Figure 6:
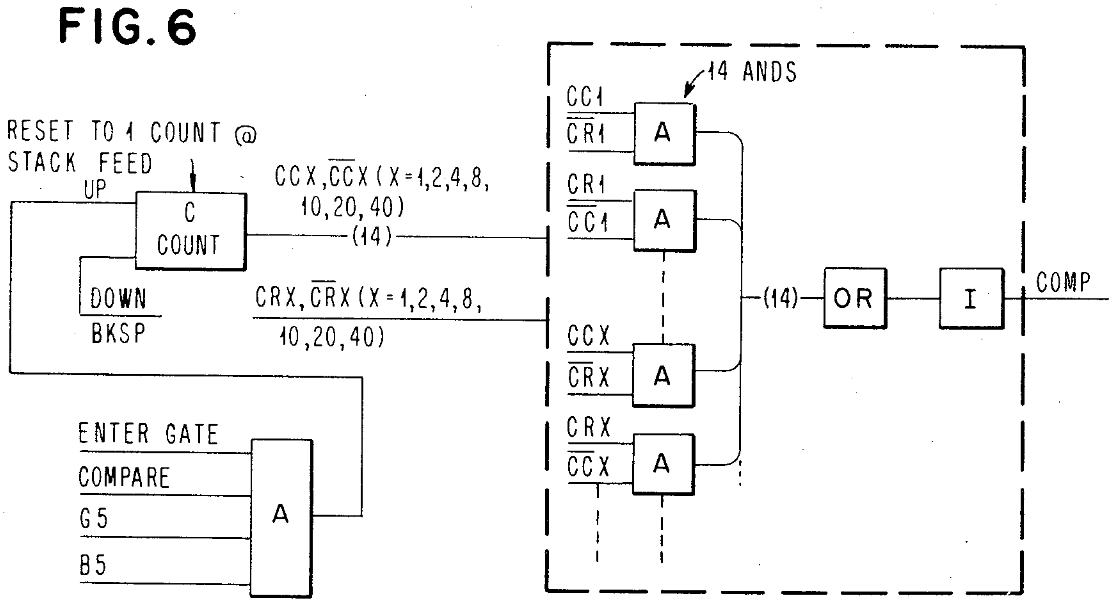
Figure 7:
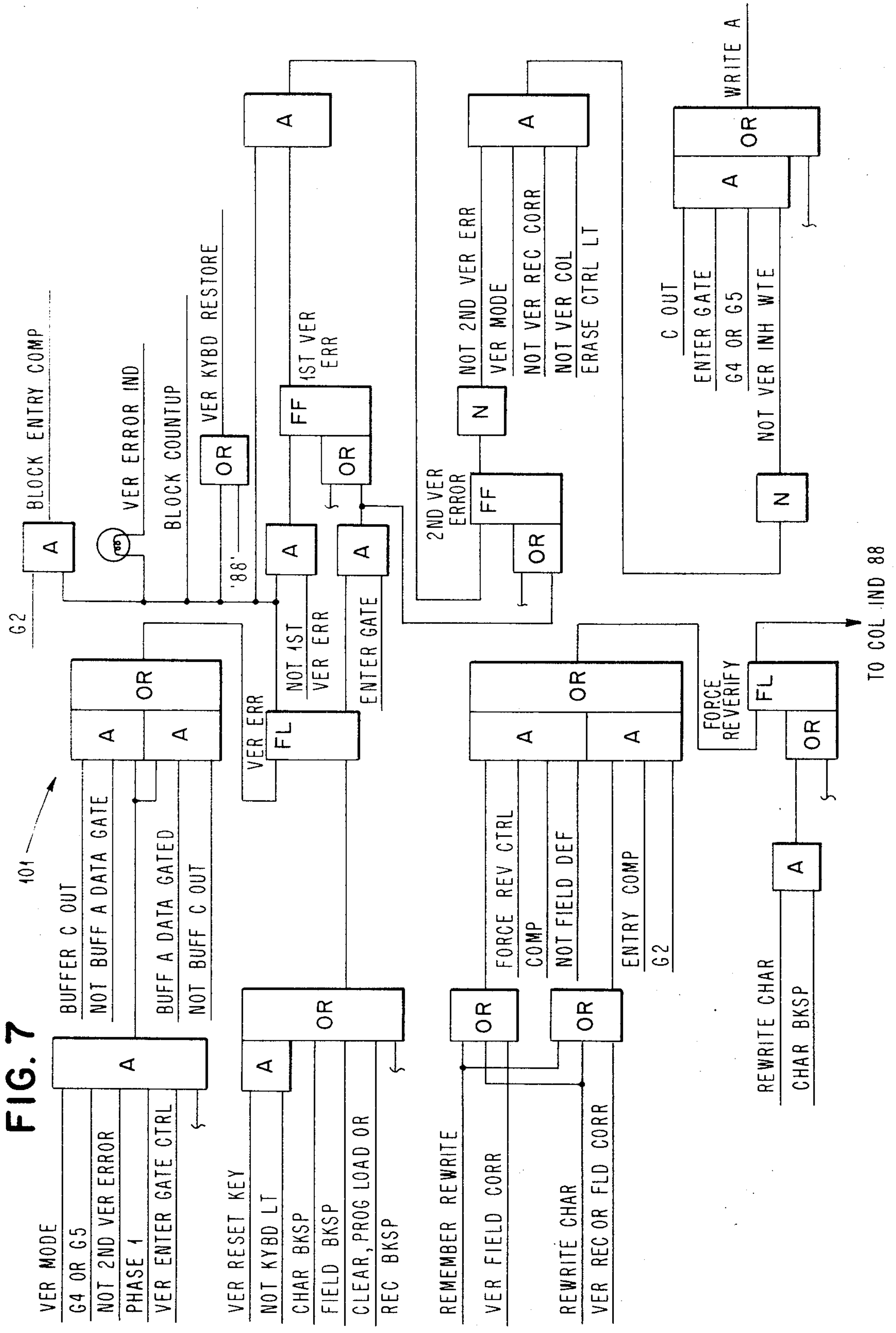

FIGS. **4*a* and 4*b*** constitute a composite logic level schematic of the circuits which control positioning of cards relative to the punch/read station, read-sensing and storage of card punch data in read and read-verification processing, and terminal handling of cards in such processing;

FIG. 5 is a logic level schematic of the circuits which control programmed interruption of the automatic escape movement of a dual card during a punch verification sequence in response to programmed interrupt information (11–0 code) pre-loaded from a program card into the system buffer store prior to the verification sequence;

FIG. 6 is a logic level schematic of dual card verification circuits for comparing keyed data and read-sensed card data indicating the manner in which card escapement is reinstated following the programmed escapement interruption caused by the circuits of FIG. 8;

FIG. 7 is a logic level schematic of circuits for accomplishing key restorig functions and error correction in subject dual card verification system;

FIGS. **8*a* and 8*b* constitute a composite circuit level schematic of logic circuits for halting pre-punched card escapement during read-sensing and key verification processing, at a terminal processing position relative to a reading/punching station (column 80** punching position), and for conditioning release of the card from this position into a stacker upon completion of a series of 80 fully verified keying operations corresponding to the punch information on the card;

FIGS. 9*a*, 9*b* and 10–15 are schematic sequence and timing diagrams used to explain the operation of the system and circuits illustrated in the above-described Figures.

DETAILED DESCRIPTION

SYSTEM OPERATIONS (GENERAL)

FIGS. 1–3, 9*a*, 9*b* and 10–15 illustrate generally the organization, operation and timing of a card processing (buffered keypunch) system embodying the present invention. Certain parts of the system are more fully described in the Kendall et al. patent application referenced above under "Cross-Reference to Related Applications."

Referring to FIGS. 1–3, 80-column record cards 1 are processed, either for punching (and printing if required) or for read-sensing, from hopper 2 through a combined read/punch-print station indicated generally at 3 into a stacker 4. The combined read/punch-print station 3 includes parallel columns of read-sensing photocell elements 5 (FIG. 3) and punching elements 6 spaced two card columns apart from each other. The read elements consist of 12 photocells PC12, PC11, PC0, PC1, . . . ,PC9 for sensing corresponding card punches. The punch elements 6 consist of 12 punch units for recording punch data in cards. A printing element 7 is located in line with the punches above the topmost punch row position (12-punch).

Cards are moved through the station by operation of an escapement system (FIG. 3) which is mechanically independent of the feed mechanisms controlling the feeding of cards from the hopper into the station and from the station into the stacker. The station escapement system comprises a step motor 9 and feed wheel 10, interconnected by shaft 11, and a pressure roller 12 which is displaceable into and out of engagement with the feed wheel 10. As a card is fed from the hopper and registered in the station roller 12 is displaced relative to wheel 10 to successively pass and then engage the lower edge of the card. Thereafter the card is moved in forward (FWD) and reverse (REV) column increments of displacement under exclusive control of step motor 9; FWD movements to the left (FIG. 1) and REV movements to the right. When the card has advanced as far forward (to the left) as it can be advanced by the step motor (card col. 80 two column spaces to the left of the punches) it is engaged and moved to the stacker by the not shown stacker feed mechanism.

The station apparatus operates in several distinct and relatively exclusive modes: PUNCH(PU), READ(RD), VERIFY(VER) and VERIFY READ(VER RD). In PU mode registered cards are stepped through the station only in FWD increments and successive columns of information are selectively punched by the punches 6. In RD, VER and VER RD modes pre-punched cards transferred from the hopper to the station in registration alignment are initially back-spaced one column increment in the REV direction and then advanced in unit column increments in the FWD direction. The REV initial step positions the first column (col. 1) of card punch information in line with photocells 5 for reading. The reasons for the registration positioning of card col. 1 beyond the read station and the operation of the step motor escape system are fully discussed in the above cross-referenced Kendall et al. patent application filed June 30, 1971. For the present it is noted only that because punching is a process practiced more frequently than reading it is more efficient and advantageous for processing throughout to register the card and initiate its FWD escape movement as close as possible to the punching section of a combined punch/read station of the type shown here.

Step motor 9 is operated in column increments of escapement by motor control circuits 15 which in turn are controlled by system control and timing circuits 17. The step motor and excape control are more fully described in the above cross-referenced Kendall et al. patent application and are detailed herein only to the extent that such circuits are relevant to and participate in the programmed dual card escapement interruption operation which is the principle subject of this application.

In RD or VER RD (or VER) modes pre-punched cards to be respectively read-sensed or read-sensed and verified are successively: fed from the hopper, registered in the station, backspaced one column increment to column 1 read-sensing position, alternately read-sensed by photocells 5 and forward stepped in unit column increments, the read-sensed information being latched when sensed and transferred in serial electrical signal from into the system buffer store 19 (FIG. 3) while the card is stepped forward.

Store 19 is a cyclic (serial) store; preferably one assembled from solid state shift register circuits. The store contains three sections (A,B,C) shifting and recirculating in parallel. Each section is subdivided into 80 column sectors. The column sectors of buffer sections A and B are each 36 bits in length and those of buffer C are 12 bits in length. Thus sectors of buffer C may be shifted in parallel with 12 bit sub-sectors of corresponding sectors of buffers A and B, as explained more fully below. Storage operations incidental to read-sensing are directed only to buffers A and B; buffer C being reserved exclusively for keyed information.

In RD mode the 80 columns of read-sensed prepunched card information are placed in successive column sectors of either buffer A or buffer B and the card is immediately released to the stacker feed mechanism. During read-sensing in RD mode the escape mechanism (step motor 9) operates without interruption at its maximal rate of one column increment of step movement per 11.52 milliseconds. Each escape cycle coincides with precisely two 80 column scanning cycles of buffer 19 and begins at a precisely defined first column point of cyclic scan time (G0 B0 CR80/1) as explained more fully below.

In VER mode read-sensed pre-punched card information is read into buffer A at the maximal escapement stepping rate, but near the end of the FWD escape range of the motor the card is held in a terminal verification punching position (card column 80 under punches) and remains in this position until appropriate columns of read-sensed information in a buffer A have been verified by comparison to corresponding signal produced by operation of keyboard 21. Upon completion of the required keying-verifications without error the card is given a final verification "OK" punch (2–3 punch in column 81) and released to the stacker.

In VER mode the information utilized for the verification keying operations is usually taken from a source document separate from the card which is being read-sensed. Therefore viewing interference or obstruction of the card surface by the station member 31 (FIG. 1) — housing the reading, punching and printing elements of the composite station — does not present a problem.

However, such obstruction would be a problem if cards receiving reading and keying-verification processing were dual cards as defined above having variably arranged surface writing in the col. 80 area (see FIG. 2) which may be required as source information for all or some of the verification keying selections. If such cards were permitted to escape automatically to the final verification punching position source information in card surface areas such as 33, 35 (FIG. 2) would be obstructed by station housing member 31. Accordingly the VER RD mode of operation, in accordance with the present invention, is used in such instances.

Before VER RD mode processing we pre-load an escape interruption program from a not-shown program card into buffer A (in RD mode). Then pre-punched dual cards are processed in VER RD mode under control of the pre-loaded program.

In this mode each pre-punched dual card to be verified is registered, back-stepped initially and fast-stepped through the station under automatic equipment control, as in ordinary RD and VER mode operation, up to a column read-sensing position (column $x$) corresponding to the sector position in buffer A of a pre-loaded escape interruption program control character (11 and 0 punch bits in a 6-bit program character sub-sector of the corresponding $x$th sector). In this position of the card when the command is sensed it sets a VER RD Interrupt Latch (VER RD INTR LT) which inhibits further release of escapement control signals to the step motor 9. In this position (card col. $x$ in read position below photocells 5 but not yet transferred to buffer A) the card is so situated relative to the obstructive station housing member 31 (FIG. 1) that source information on the face of the card which is required to complete the first $x$–1 verification keying selections is totally viewable without obstruction. In other words the interrupt position is programmed so that source information requisite to the first $x$–1 verification keying operations is situated to the left and/or to the right of the housing member 31 but not beneath the latter.

Upon completion of the foregoing $x$ —1 keying selections and verification (and if necessary correction) thereof as described below VER RD INTR, the latch set by the 11–0 command, is reset, thereby releasing the escape controls of the system for further actuation of the step motor 9. The card is then FWD stepped, either to a second program interrupt position established by a second 11–0 program character in the buffer, or to the final holding position for verification OK punching (col. 80 under punches) for handling thereafter as in ordinary VER mode.

Figure 1:
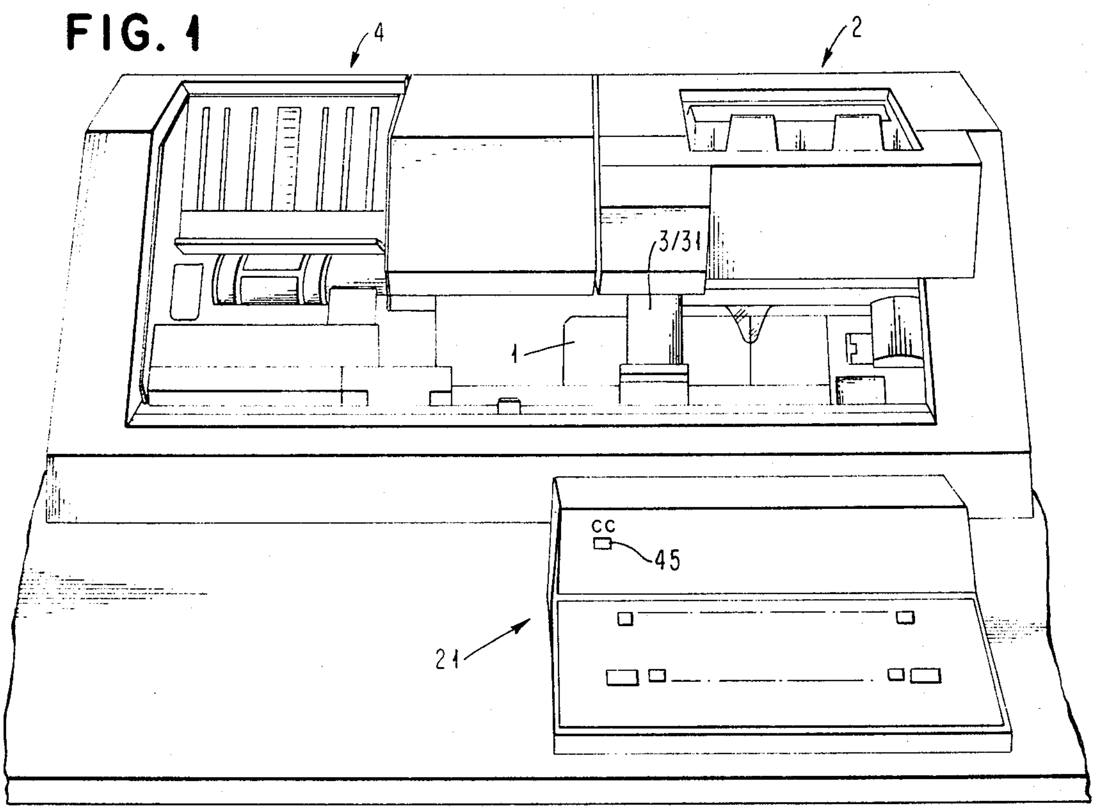
FIG. 1 is a view in perspective of apparatus incorporating the present invention.
Figure 2:
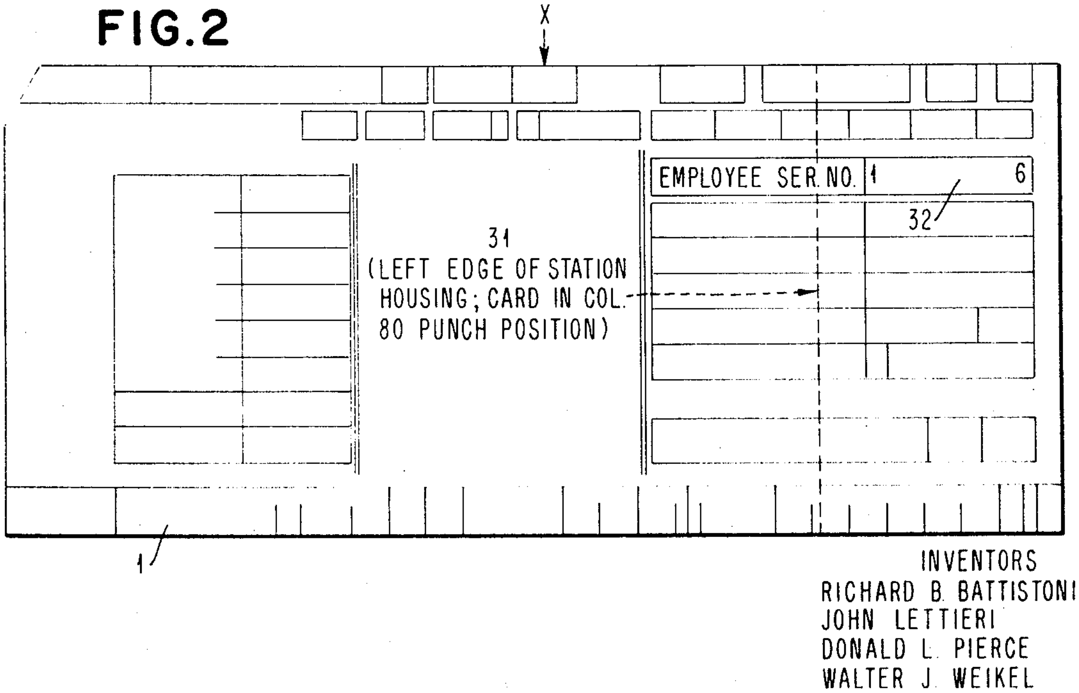
FIG. 2 illustrates typical positioning of source information on a dual card and the associated viewing problem relative to the obstructive processing (punch/read) station of FIG. 1 which is eliminated by means of the present invention.
Figure 3:
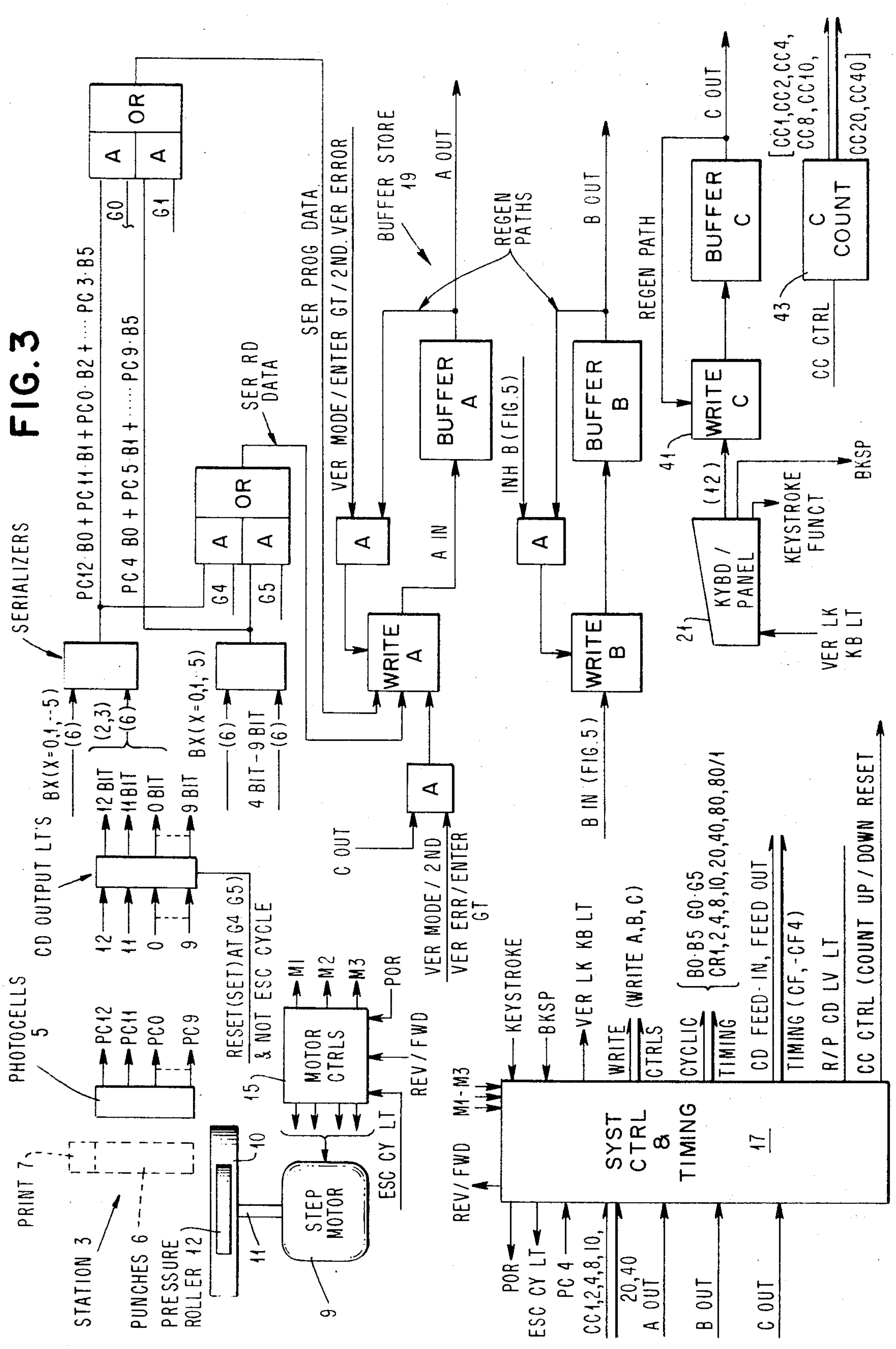
FIG. 3 is a schematic block diagram of relevant portions of the station and keying equipment and electronic circuits housed within the apparatus of FIG. 1.

VER and VER RD mode operations of the keybd and associated panel indicators indicated generally at 21 in FIG. 3 include decoding functions for translating key operations into serial electrical signals in card punch code format (i.e., 12 bit character groups). Such signals at appropriate times are transferred through Write C connection logic system 41 to appropriate time spaces of section C of buffer 19. With each uninhibited key operation the key information written into buffer C is verification-compared to information contained in corresponding column sectors of buffer A.

The C Counter 43, which controls the selection of the C sector to be loaded from the keys for verification comparison, is incremented ('count up') upon successful completion of verification comparison. A verification locking keyboard control latch (VER LK KYBD LT) blocks keying at the start of VER mode or VER RD mode operation until at least one column of card information to be key-verified has been read into buffer A. The keys are thereafter permitted to be operated only while the C Count is less than the column sector "address" in buffer A of the last read-sensed card column.

Figure 10:
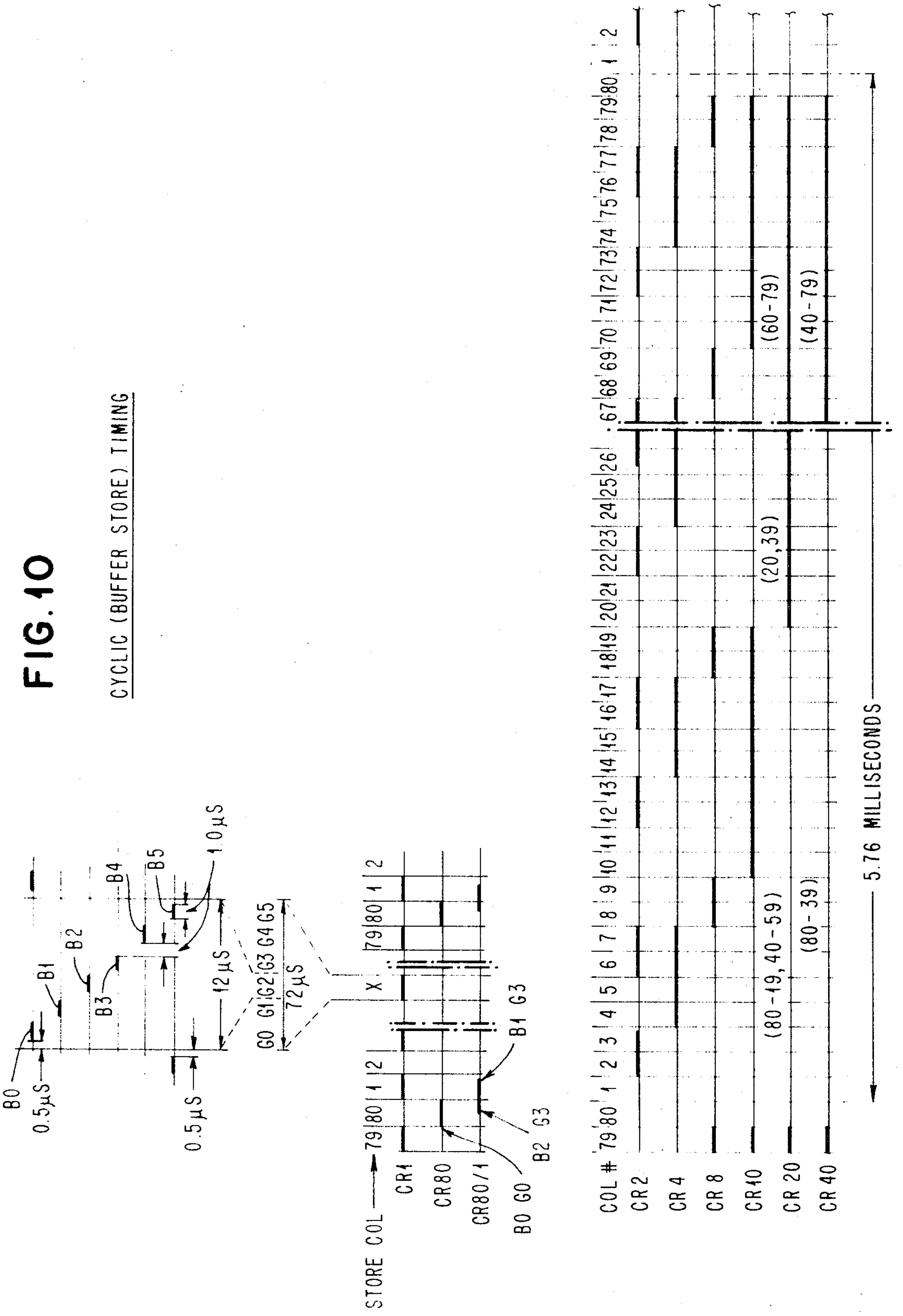
Figure 11:
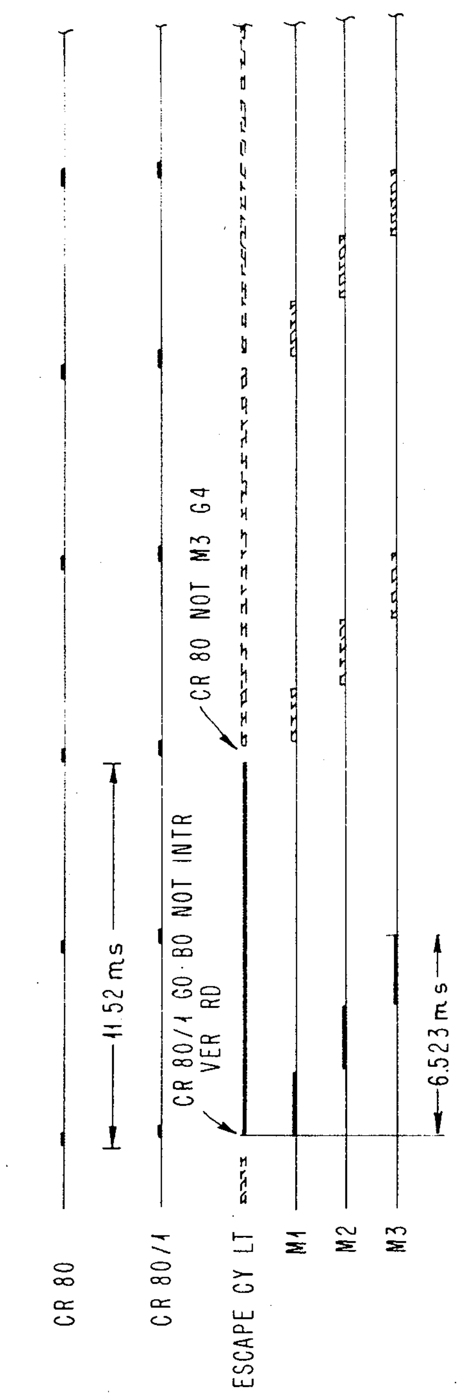
Figure 12:
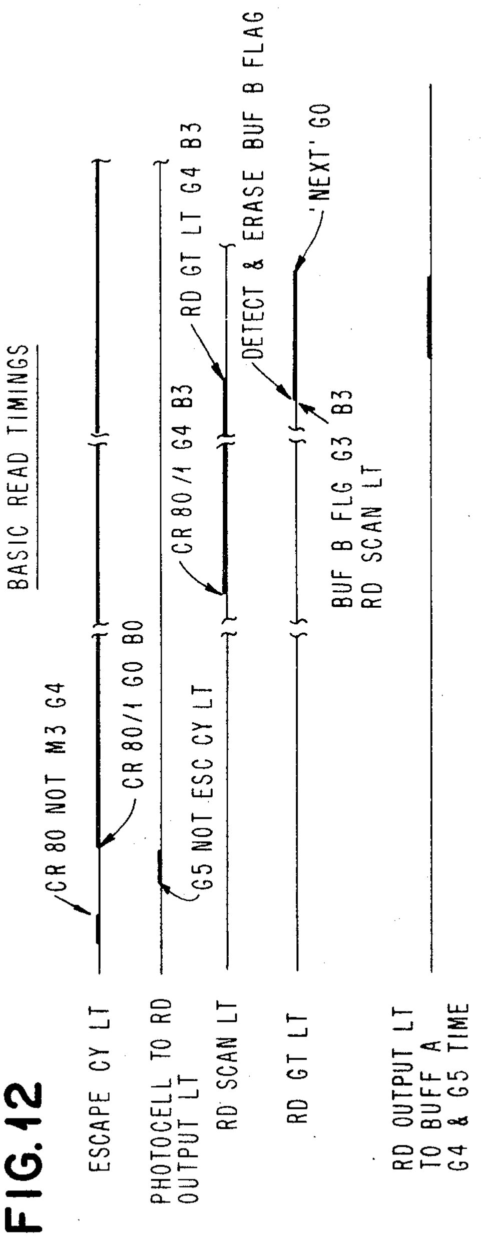

After each uninhibited (unblocked) keystroke the static states of stages $CCx(x=1,2,4,8,10,20,40)$ of the C counter are parallel compared with respective dynamically varying column ring timing functions $CRx(x=1,2,4,8,10,20,40)$ shown in FIG. 10. During the particular 72 microsecond sector scan interval in which these functions match (once per 80 sector scans; at sector position corresponding to the state of $CCx$) keyed column information translated into serial form is written repeatedly in the column sector of buffer C corresponding to the then static state of $CCx$. This repeated writing of keyed column information into one sector of buffer C serves to reduce the probability of keying error due to contact bounce and/or jitter effects.

After several such iterated writing transfers into buffer C, the column information last keyed and written into buffer C is verification-compared to the read-sensed card character correspondingly located in buffer A. If this verification comparison is successful (No Verify Error) the C Count is unit incremented causing the C count-ring timing comparison to extend for an additional 72 microsecond G cycle. In this extended cycle buffer B is sampled for a Read Flag condition, which if present resets VER RD INTR LT should the latter be set. Thus interrupted read escapement in VER RD mode is restored upon such read flag detection. As shown below the buffer column sector of read flag detection coincides with the read-sensing position of the halted card established by the setting of VER RD INTR LT.

Should a verification error be detected during keying count up input to C Counter is inhibited, a Verify Error panel light turns on, and the keyboard is disabled by setting of VER Error latch. This indicates to the key operator the occurrence of a verification error requiring corrective action. The operator must then operate a "Verify Rest" key which resets the error light, releases the keys and sets a "1st Verify Error" trigger. The operator then re-keys the last character into buffer C as before, and the character verification comparison is repeated. If a second verification error is detected the same error reset procedures are repeated as above. At second operation of Verify Reset key a "2nd Verify Error" trigger is set and the operator proceeds to re-key the character a second time. However, "2nd Verify Error" set causes the twice re-keyed character to be transferred from buffer C into buffer A, replacing the read-sensed card information character in buffer A which has twice failed to compare with the keyed character. The C count is incremented. Then, depending upon programming conditions, force re-verify contols are activated to insure re-verification of the replacement character in buffer A before keying and verification of successive characters is permitted.

In this manner the operator may complete keying and verification of an entire 80 column field, replacing incorrect card-sensed characters in buffer A with keyed information. Ultimately, the card may be either verify OK punched (2–3 punch code) if no verification error correction (character replacement) has been made or it may be released to the stacker without OK punching if buffer A data has been corrected. When the A buffer has been corrected in this manner a duplicate non-dual card is prepared simply by inserting the duplicate card blank into the station and operating the system to punch fully verified characters automatically from buffer A.

BUFFER STORE TIMING

The timing of buffer scanning (shifting) cycles is determined by cyclic column ring timing functions CR$x$($x$=1,2,4,8,10,20,40,80,80/1) shown in FIG. 10. Symmetric timing function CR1 is turned on and off at "column sector timing" intervals of 72 microseconds. Each of these 72 microsecond intervals is sub-divided into 12 microsecond "character timing" subintervals defined by the "G-Ring" functions G0,G1,G2,G3,G4 and G5 recurring cyclically in immediate succession. The 12 microsecond "character-timing" interval defined by each G pulse is sub-divided further into six discrete "bit timing" sub-intervals defined by successive pulses B0,B1,B2,B3,B4 and B5. These "bit timing" B pulses occur successively at intervals of 2 microseconds and have respective "on phases" of 1 microsecond duration. The rise of B0 lags the rise of the respective G pulse by ½ microsecond and the fall of B5 leads the fall of each G pulse by ½ microsecond.

Buffers A and B each contain 80 36-bit column sectors (2,880 bit storage stages). Bits are written and recirculate in synchronism with the above B pulses so that each of these buffer sections is shifted by 36 bit spaces or one complete column sector in each complete 72 microsecond cycle of the above G pulses (i.e., in each half-cycle of CR1 or full cycle of the G pulses) and each circulates through a full 80 column sector revolution in 80 complete cycles of the G pulses (i.e., in $72\times80\times10^{-3}$=5.76 milliseconds).

Buffer C contains 80 12-bit sectors (960 bits) and recirculates dynamically in step with the B pulses in each G interval. However, the Write C controls are effective only during G4 and G5 times and thereby successive columns of written information are placed effectively three columns apart in this buffer and interlaced in a manner well known to those skilled in the art.

The 72-microsecond pulse CR80 occurs once per 80 half cycles of CR1 in coincidence with the off phases of all column timing rings (i.e., coincidence of Not CR$x$ for all $x$; where $x$=1,2,4,8,10,20 and 40). Thus CR80 coincides with the recirculation of a particular one of the 80 column sectors in each of the buffers A, B and C. This sector by convention is the sector for storage of the eightieth information column (column sector No. 80) of a series of 80 information columns and is followed immediately in time by the sector used to store the first information column (column sector No. 1) of such a series. The 70 microsecond pulse CR80/1 rises at phase G3 B2 of CR80 and terminates at phase G3 B1 of the next half-cycle of CR1. This pulse therefore spans the recirculation times of the last 17 bit storage positions of col. sectors No. 80 of buffers A and B and the first 18 bit storage positions of col. sectors No. 1 of the same buffers. CR80/1 also spans the recirculation of all of the 12 bit spaces of col. sector No. 80 of buffer C.

The recirculation phases of col. sectors No. 2–79 coincide with particular combinational states of the column ring timing functions CR1,CR2,CR8,CR10,CR20 and CR40 shown in FIG. 10.

CARD REGISTRATION FOR READ SENSING

Figure 9A:
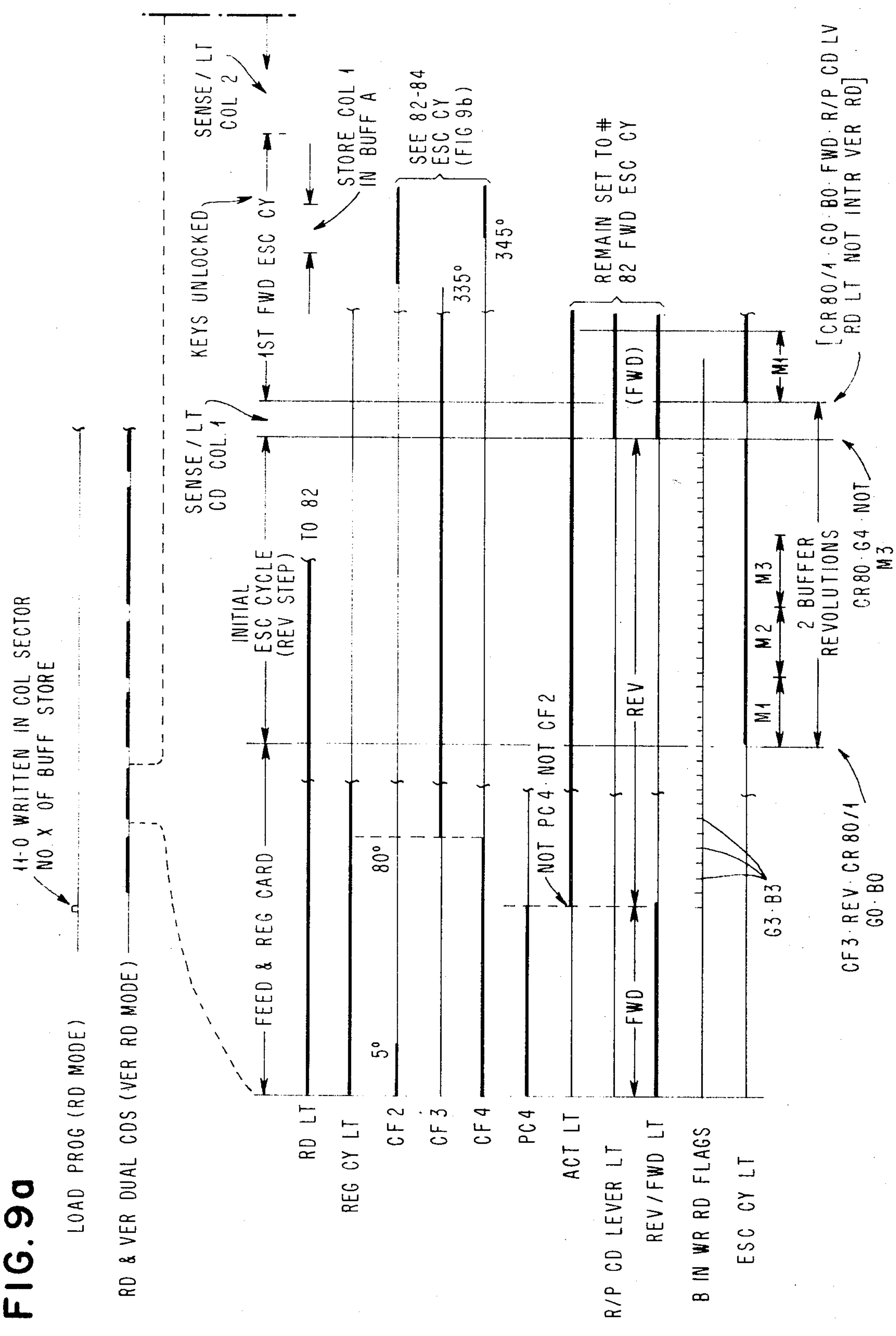
Figure 9B:
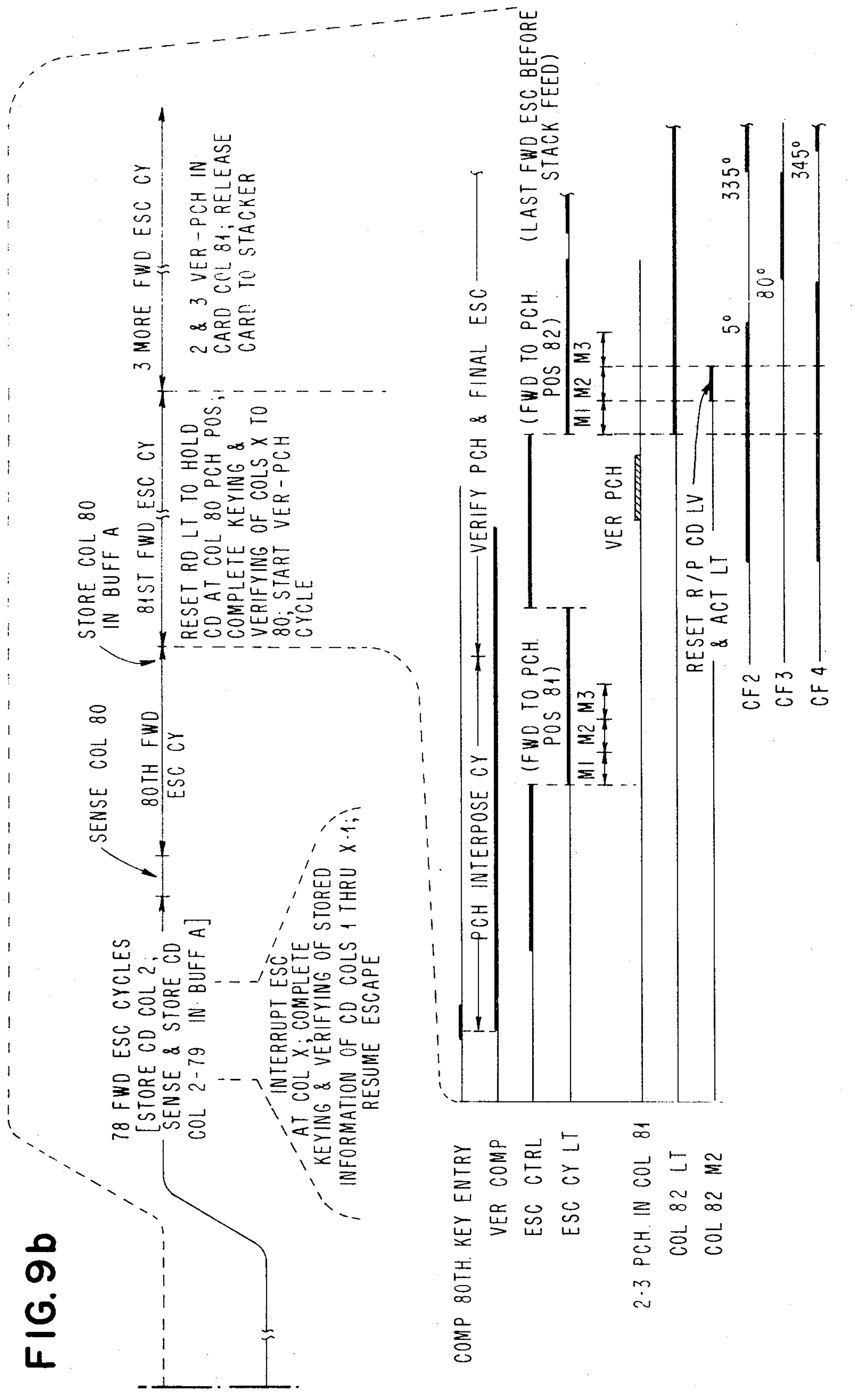

FIGS. 3, 9*a*, 9*b* show how cards are fed into the station and registered for read-sensing and subsequently transferred out of the station for stacking. The not-shown registration feed mechanism for feeding the card out of the hopper registering it in the station and coupling it to the station escapement system (step motor 9, feed wheel 10 and pressure roller 12) is of well known design. A stacker feed mechanism, also of known design, engages the card as it moves out of the range of engagement of the station feed wheel and pressure roller and transfers the card to the stacker.

As the registration feed mechanism cycles through its 360° range of feed displacement the pressure roller 12 which is normally spring biased against the feed wheel 10 is displaced first away from the feed wheel sufficiently to allow the card edge to move freely between the pressure roller and feed wheel and then back against the card and feed wheel gripping the card. While the roller is displaced away from the wheel the card is moved into alignment and registration in the station (column 2 of the card in read-sensing position), and when the roller engages the card, the step motor and feed wheel assume exclusive control of the card positioning function.

Since column 2 of the card is in read-sensing position at initial registration (column 2 aligned with the read photocells 5, FIG. 3) for RD, VER and VER RD mode operation it is necessary to perform a preliminary reverse escape step to backspace the registered card by one column increment of displacement to permit read-sensing of the first card column. The reason for this "over-displacement" of the card in the feeding operation, as explained before, is that since punching is the predominant operation of the apparatus it is more efficient to locate the first punching column of the card as close to the punch station as possible at registration. Also it is useful to use the read-sensing photocells for card edge detection during feed-in.

During the cycle of card registration feed-in defined by set condition of Register Cycle Latch (REG CY LT), Card Feed latches CF2,CF3 and CF4, and read photocell PC4 (which is normally used to read-sense No. 4 information punches on the card) control release of the first escape excitation to step motor 9.

Referring to FIGS. 3, 4*a*, 4*b* and 10*a*, card feed latches CF2,CF3 and CF4 define 5°,80°,335° and 345° phases of the registration feed cycle. In RD and VER RD modes this feed cycle spans the first (reverse) escape cycle of the motor used to backstep the card to column 1 read-sensing position. In RD, VER or VER RD mode, Read Latch (RD LT) and Register Cycle Latch (REG CY LT) are set on 1st feed cycle and Active Latch (ACTV LT) is set between the 5° and 80° feed stages after read-sensing photocell PC4 (the cell normally sensing No. 4 punches in card columns) has been blocked (condition "Not PC" 4) by the action of the leading edge of the card as it passes between the cell and light source while entering the station on 2nd feed cycle.

RD and ACTV latches remain set during virtually the entire interval of card handling in RD mode until shortly before the card is picked up for stacker feeding. In VER or VER RD mode, RD LT gets reset as col. 80 of the card moves into alignment with the punches.

Reverse/Forward Latch (REV/FWD) normally in FWD state (FWD output "on" and REV output "off") is set to REV state (REV on; FWD off) by concurrence of FWD state and set condition of ACTV and RD latches. Escape Cycle (ESC CY) Latch (FIG. 4*b*), which controls release of drive excitation to step motor 9, is set for the 1st reverse escape (RD, VER or VER RD mode) by concurrence of REV, CF3, CR80/1, G0 and B0 (from the discussion of storage operation above it will be seen that this condition coincides with recirculation timing of the first bit of col. sector No. 1 of buffers A and B). The reverse drive excitation released to the motor is thereby time coordinated with the buffer store circulation, and due to REV condition produces reverse motion of the motor by one column increment of displacement (to the right in FIGS. 1 and 4). Since the card is completely registered before CF3 is brought up (i.e., before 80° of Feed-In Cycle) the card will be registered and fully engaged by the pressure roller before the reverse movement of the motor and end up in column 1 read-sensing position at the end of the reverse motor step.

At 72 microsecond intervals defined by concurrence of G3 and B3, within the larger interval bounded by successive setting of ACTV latch and Read/Punch card lever (R/PCd Lever) latch, 1-microsecond pulses are transferred to "Write B In" line (FIG. 5*a*) and thereby written into G3 B3 bit spaces of consecutive column sectors of buffer B for use subsequently as Read Flags (Rd Flgs). During subsequent read-sensing operations (RD, VER or VER RD Mode) these flags are successively erased as read-sensed information is tranferred from respective card columns to respective column sectors of buffer A. Thus the first unerased Rd Flg subsequent to coincident occurrence of CR80/1 and G0 provides a reference to distinguish the next column sector to buffer A scheduled to receive the respective next column of read-sensed card information. At CR80 G4 of the second buffer "revolution" after the beginning of the initial reverse escape cycle of read-sensing (a point in time distinguished by the escape drive condition Not M3 as characterized in FIGS. 4*a*, 9*a* and 11) REV/FWD is reset to FWD and remains in FWD state for the remainder of RD, VER, VER RD Mode escape handling. Coincidence of Not CF4, FWD and ACTV at the conclusion of the initial reverse escape step sets R/PCd Lever latch, blocking further writing of Rd Flgs into buffer B (FIG. 4*a*).

FORWARD ESCAPE AND READ-SENSING OF CARD IN RD, VER OR VER RD MODE

REV/FWD is reset to FWD at coincidence of CR80, Not M3 and G4 (FIG. 4*a*) and remains in FWD state thereafter throughout subsequent card handling operations in RD, VER and VER RD modes. ESC CY LT, reset at coincidence of CR80 and G4 (during second buffer cycle of 11.52 millisecond escape interval) is set for the first forward escape at the next coincidence of G0 and B0 (R/PCd Lever, FWD and Not INTERRUPT VER RD conditions also being present at this time); i.e., in synchronism with the beginning of recirculation of buffer store 19.

Figure 4A:
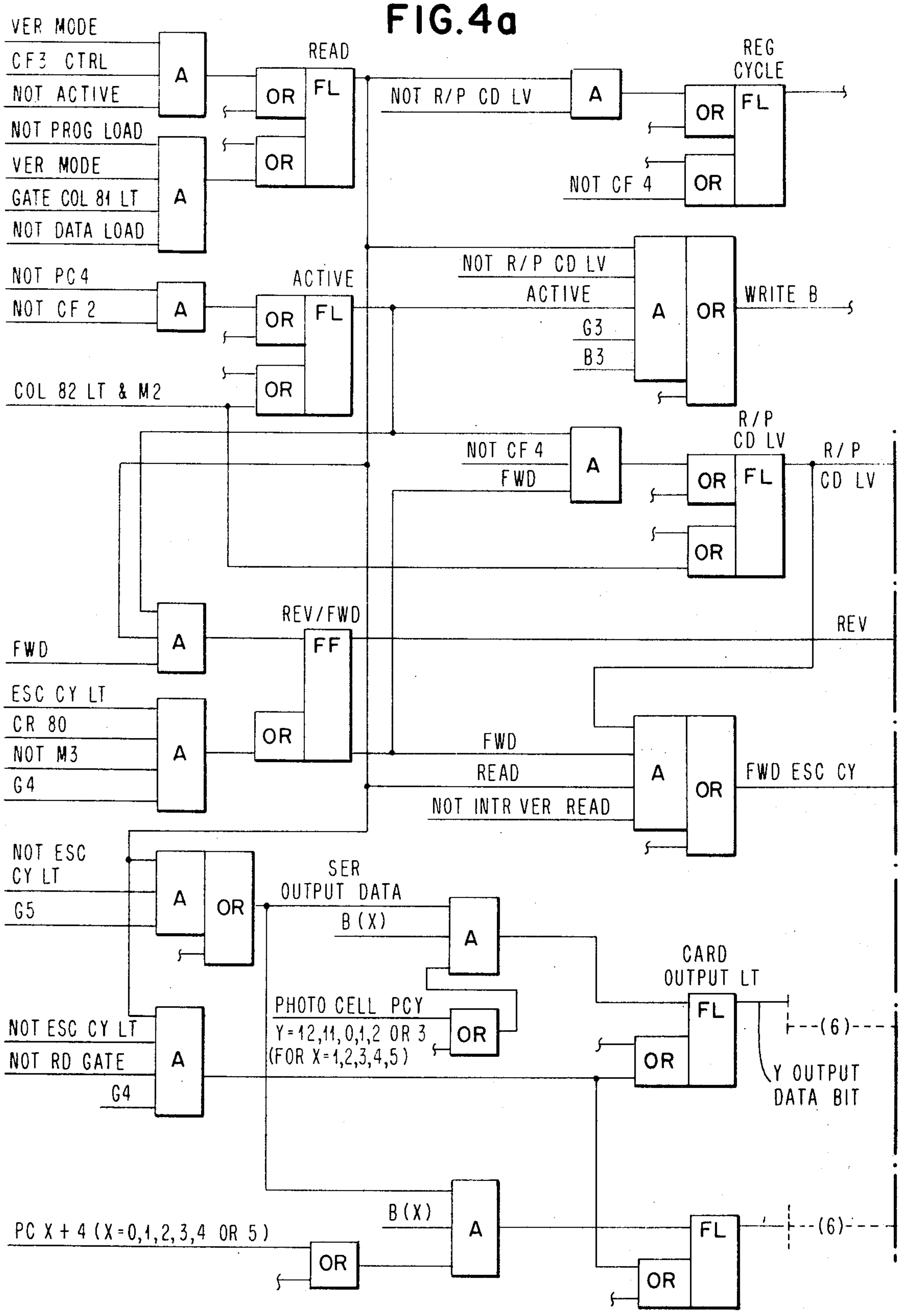
Figure 4B:
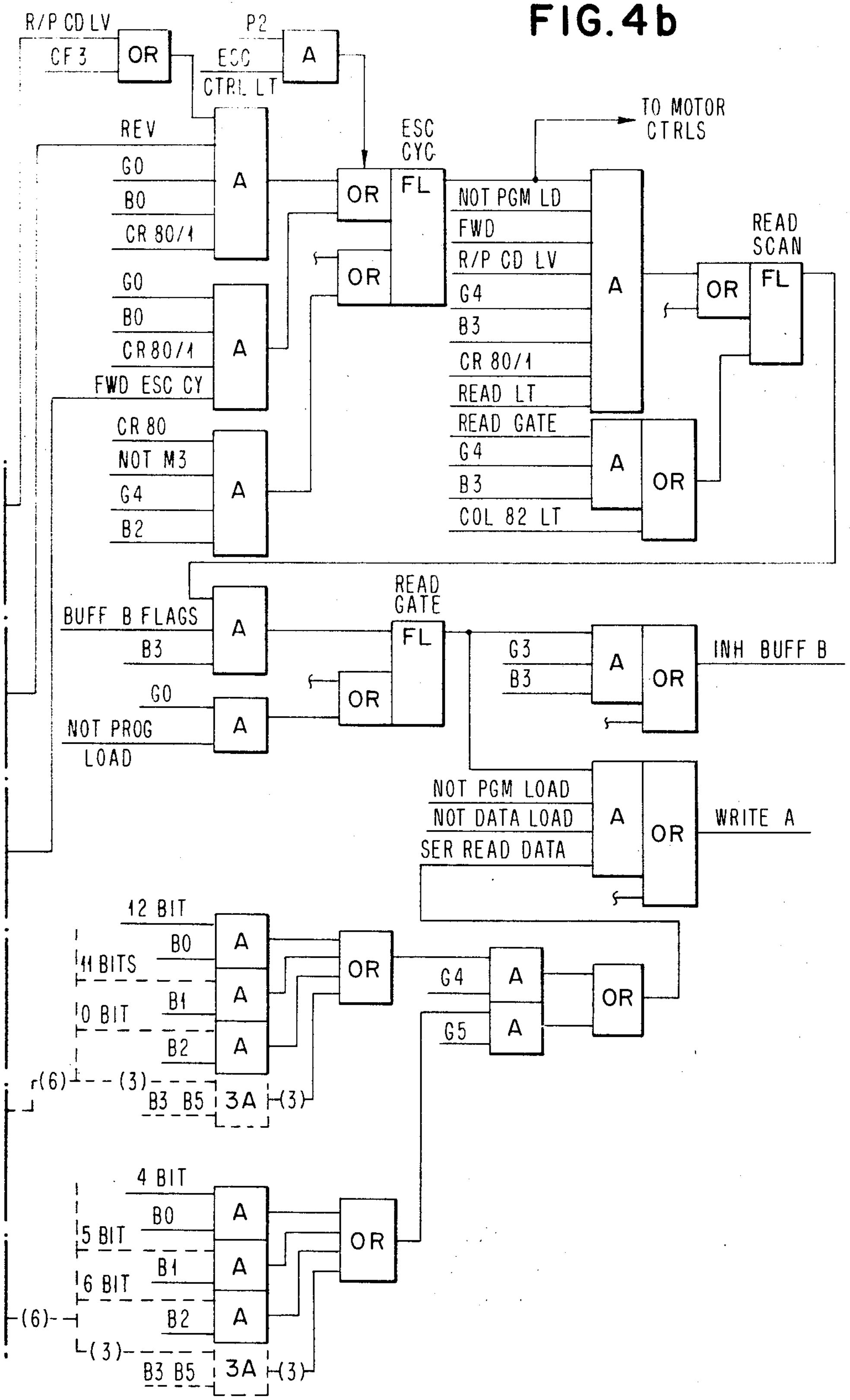

During the G5 interval intermediate the first resetting of ESC CY latch, after the reverse escape movement, and subsequent setting of ESC CY latch to start the first forward escape movement, the information in column 1 of the card is read-sensed by the photocells and latched in the 12 Card Output Latches (Cd Outpt Lts) shown in FIGS. 3 and 4*a*. During subsequent recirculation of buffer A column sector 1, in the second half of the first forward escape cycle (particularly during subsectors G4 and G5) the information in the 12 Cd Outpt Lts is serially scanned and transferred to buffer A. This process of read-out to Cd Outpt Lts between escape movements and transfer of latched information to buffer during escape movements is repeated for each forward escape movement of the (i.e., for each cycle of operation of ESC CY LT); the latter movements being interrupted in VER RD mode only be setting of Verify Read Interrupt (VER RD INTR Latch (see FIGS. 4*a*, 5, 13) or Escape Control Latch (FIG. 8*b*, 9*b*) bringing to an end one of the conditions (Not VER RD INTR or Not Escape Control) governing forward escape at various stages of VER RD mode handling. Control of VER RD INTR latch condition is shown in FIG. 5 and discussed below. Control of Escape Control Latch is indicated in FIG. 9*b*.

FIGS. 3, 4*a*, 4*b*, 9*a*, 9*b* and 10–12 show the basic organization and timing of escape and read-sensing controls for RD, VER and VER RD Mode operation. Read Scan (RD SCN) latch (FIG. 4*b*) is set at coincidence of CR80/1, G4 and B3 approximately midway through each FWD escape cycle conditioned by R/PCd Lever. Note that since each such escape movement starts (FIG. 12) at coincidence of CR80/1, G0, B0 and since CR80/1 starts (FIG. 10) at G3 B2 and ends at G3 B1, coincidence of CR80/1, G4 and B3 for setting of RD SCN does not occur until about 80 column sectors after the start of the escape. RD SCN latch is reset at G4 B3 of the column sector scanning cycle in which Read Gate (RD GT) Latch (FIG. 4b) is set. RD GT is set by the first B Out Read Flag (Rd Flg) from buffer B (G3, B3 time) following setting of RD SCN. Setting of RD GT inhibits regeneration (recirculation) of this first flag, thereby erasing it from buffer B.

Card Output (Cd Outpt) latches (FIGS. 3, 4*a*) are reset at G4 of Not ESC CY in the interval between step movements and set by respective photocell outputs of the Read Station during G5 of Not ESC CY. During subsequent escape drive data in Cd Output Lts is serialized in groups of 6 bits (FIG. 4*b*) by $Bx(x=0,1,\ldots,5)$ and transferred serially to buffer A by set condition of RD GT (caused by read-out and erasure of first Rd Flg from buffer B) during concurrent G4 and G5 intervals. RD GT is reset with the leading edge of next G0.

The foregoing sequence — resetting and setting of Cd output latches during Not ESC CY, setting of ESC CY, RD SCN, RD GT, scanning and erasure of first Rd Flg in buffer B during RD SCN, transfer of Cd Output Lt data into buffer A during RD GT — is repeated until VER RD INTR LT is set as explained below.

Soon after erasure of the first B Rd Flg marking the column sector storage location of the first card information to be key-verified (VER or VER RD mode) Verify Lock Keyboard Latch (FIG. 4) is reset releasing the keyboard (which up to then is blocked) for verify-keying operations. In such keying operation information produced by keying is stored in successive column sectors of buffer C designated indirectly by C Count (FIG. 3) and verify-compared to the read-sensed card punch information stored in respective column sectors of buffer A. Since transfer of Cd Outpt latch information to buffer A and escape positioning of the card proceed quite rapidly, until escape is interrupted in VER RD mode by setting of VER RD INTR, the keys may be safely released for verify keying as soon as buffer A receives the first column of card information which is to be key-verified.

INTERRUPTION OF FORWARD ESCAPE AND READ SENSING OF DUAL CARDS/VER RD MODE

FIGS. 3, 5, **9*a*, 13 and 14 show the controls and timing of interruption of forward escape movement and read-sensing of dual cards in VER RD mode. Lookahead Read Scan (LKHD RD SCN) latch (FIG. 5**) is set by RD GT (i.e., at G3, B3 time of first Rd Flg detection) and reset by the leading edge of the following G3. Thus LKHD RD SCN remains set for almost a complete G cycle after the sensing and erasure of the Rd Flg locating the last buffer A column sector receiving read-sensed card information. Coincidence of LKHD RD SCN, B1 and Program (11-bit) output from buffer A or B depending on program level being used at B1 time is the condition (FIG. 5) for setting INTR VER RD LT. If an 11-punch bit at B1 time is not followed immediately at B2 time (1 microsecond after end of B1 time) by a 0-punch program bit INTR VER RD is immediately reset before it can affect card escapement. Thus, earlier storage of a program combination of an 11 punch and other than a 0 punch (which is useful program information not related to interruption of VER RD escapement) causes only momentary setting of VER RD INTR for too brief a time to affect VER RD Mode escapement, whereas storage of the 11–0 punch program combination sets VER RD INTR and leaves it set untilcompletion of specific verify keying operations in accordance with the present invention.

Figure 13:
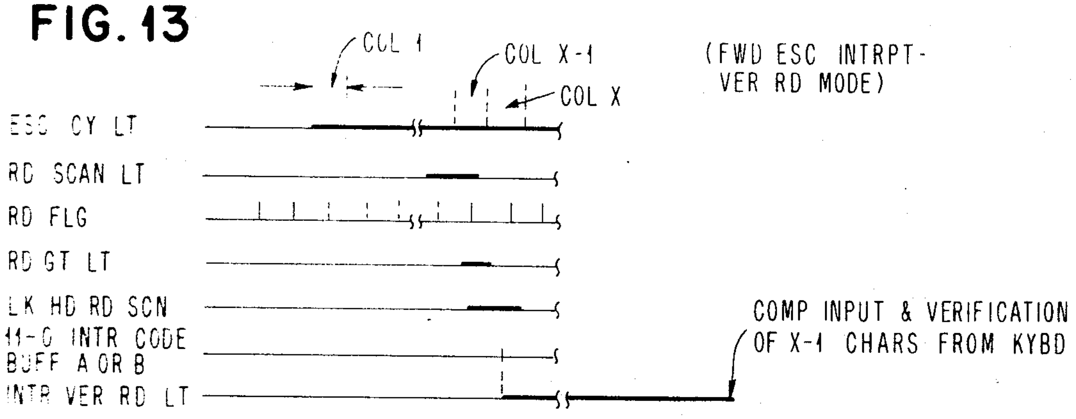

Referring to FIG. 13 location of the 11–0 program for VER RD escape interruption in column sector *x* of buffer A causes the dual card to be halted with column *x* of the card in read-sensing position in the read station. Any source information on the card, which is subject to obstruction (e.g., in area 32, FIG. 2) and which may be necessary for keying-verification of card information stored in buffer A column sectors 1 through *x*–1, will at this point be situated in unobstructed viewing position relative to station housing 31 (see FIG. 1).

RESUMPTION OF ESCAPE MOVEMENT AFTER VER RD MODE PROGRAM INTERRUPTION

Resumption of the program interrupted VER RD mode escapement (i.e., reset of VER RD INTR) requires keying and verification/comparison of *x*-1 columns of information. Some or all of this information will be on the dual card which is in the station. The keyed information is transferred to buffer C as described below and the verification-comparisons are made relative to read-sensed card information stored in corresponding column sectors of buffer A.

Setting of VER RD INTR LT degates further setting of ESC CY LT (FIG. 4*b*) thereby preventing further escape movement and setting of RD SCN and RD GT Latches. In turn this prevents further setting of LKHD RD SCN LT, blocking further scanning of buffer A for pre-loaded 11–0 Program Control functions. At this stage therefore the dual card remains stationary and the keys are operable.

Referring to FIGS. 3, 6, 7 and 14 the function COMPARE turns "on" when all C Count stages CC*x*(*x*=1,2,4,8,10,20 and 40) coincidentally match respective storage timing functions CR*x*(*x*=1,2,4,8,10,20,40). Initially, before any keys have been operated, the C Count is reset to produce COMPARE in the 72 microsecond intervals beginning with the lagging edge of CR80 (i.e., the interval in which CR1 is on and CR2,4,8,10,20 and 40 are all off, which is also the recirculation interval of buffer column sectors 1). Coincidence of a key operation and COMPARE sets Keyboard Latch (KEYBD LT) and Keyboard Restore Latch. These latches remain set thereafter for several cycles of repetition of the COMPARE function during each of which Write C control causes repeated writing of the keyed information into buffer C, in the requisite serial form, during intervals G4 B*x* and G5 B*x*(*x*=0,1, . . . ,5) in the buffer C colun sector coinciding with COMPARE (i.e., corresponding to the C Count). For the first key operation this sector will be col. sector 1 of buffer C.

After several Write C transfers of the same key data to the same buffer C column sector (which tends to reduce probability of error due to contact bounce or jitter) Enter Gate is brought up for 72 microseconds by concurrence of COMPARE and keyboard timing functions Not D1,D2, Not D3 and Not D4. With Enter Gate up outputs of buffers A and C at G4 and G5 are serially verifycompared in exclusive-Or circuit 101 (FIG. 7) and mismatch output of this circuit is used to set Verify Error Latch (VER ERR) shown in FIG. 7.

Assuming that VER ERR is not set by the end of G5 B5 of the COMPARE/Enter Gate interval Count Up Control (FIG. 6) transfers a Count Up input pulse to C Counter; increasing the C Count by a unit amount. This causes COMPARE to stay on for another 72 microseconds since the incremented C Count and the just changed CR ring functions wil continue to match for another G cycle.

Referring to FIG. 5 at coincidence of G3,B3, COMPARE and Not Force Re-verify the recirculating output of buffer B is sampled for a Rd Flg serving as the condition to reset INTR VER RD LT. Since such flags have been erased from all B column sectors preceding the xth sector (i.e., the sector of the 11–0 interrupt program signal) INTR VER RD will not be reset until C Count corresponds to x (i.e., until C Count is incremented at completion of verification of the (*x*–1)st key selection). Thus, at coincidence of Enter Gate, G5 and B5 following the (*x*–1)st key operation, assuming no verification error, COMPARE will be extended by the Count Up input to C Counter so that at G3 B3 of the extended interval (the interval coinciding with recirculation of the xth column sector of the buffers) a buffer B Rd Flg will be sampled and produce resetting input to INTR VER RD LT.

CONTINUATION OF CARD ESCAPE AND VERIFICATION AFTER RESETTING OF VER RD INTR

Figure 8A:
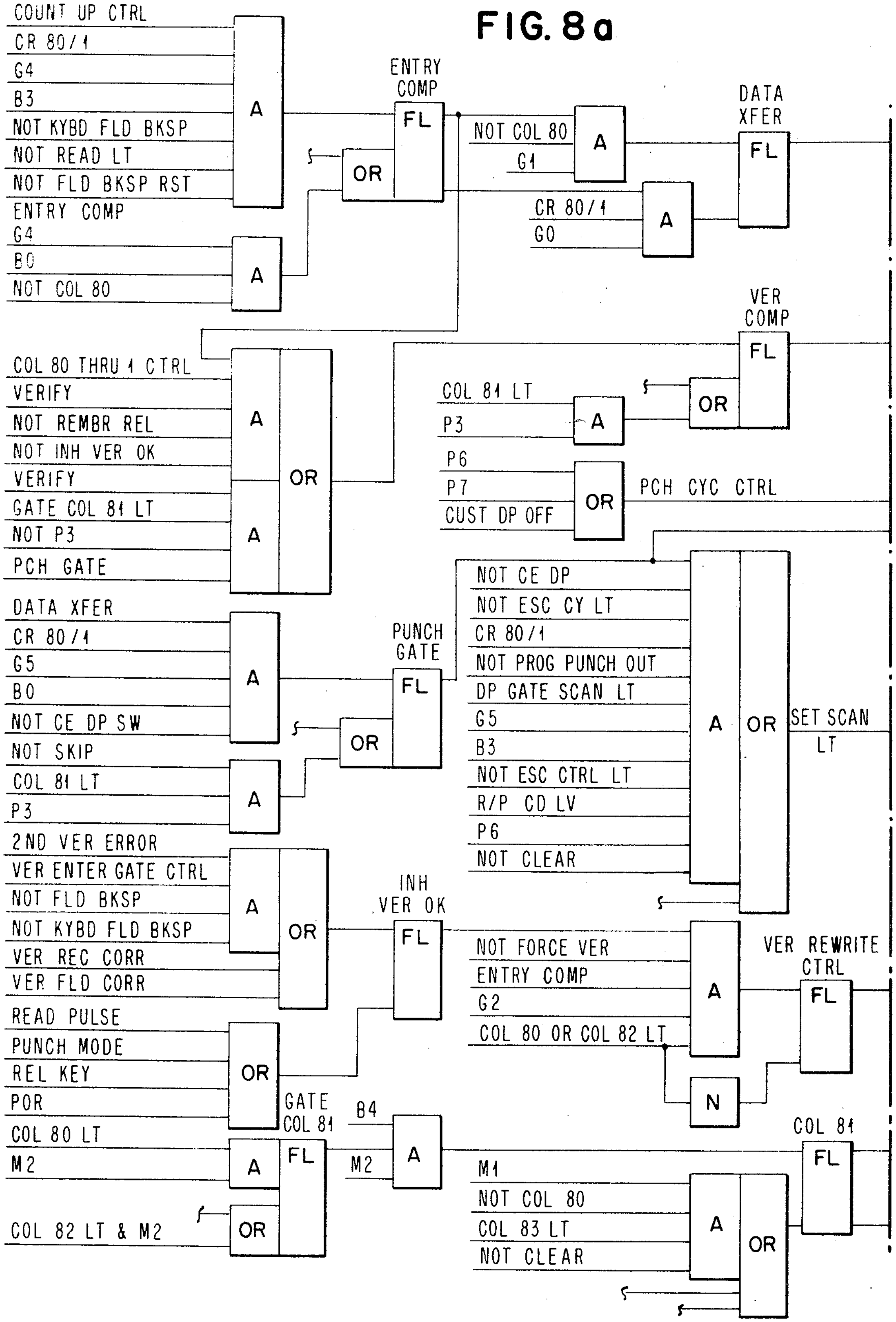

When INTR VER RD has been reset ESC CY latch is eligible to be set so that escapement may resume. If no other 11–0 program control signals have been stored (the usual case) the card will escape freely up to the column 80 punching position (column 82 sensing position) at which the setting logic of ESC CY LT is degated by resetting of RD LT (FIG. 4*a*) through setting of gate column 81 latch (FIG. 8*a*). Gate column 81 is set at M2 of the card escape from 81 to 82 column sensing position (79 to 80 column punching position) by concurrence of M2 and col. 80 latch. Col. 80 latch (FIG. 4*b*) is set by concurrence of CR80/1 and RD GT (i.e., concurrent in time with erasure of 80th column Rd Flg from buffer B and transfer of 80th card column information to buffer A) at M3 of the escape from column 80 sensing position (i.e., at a late point of the escape preceding the gate col. 81 setting escape).

Figure 8B:
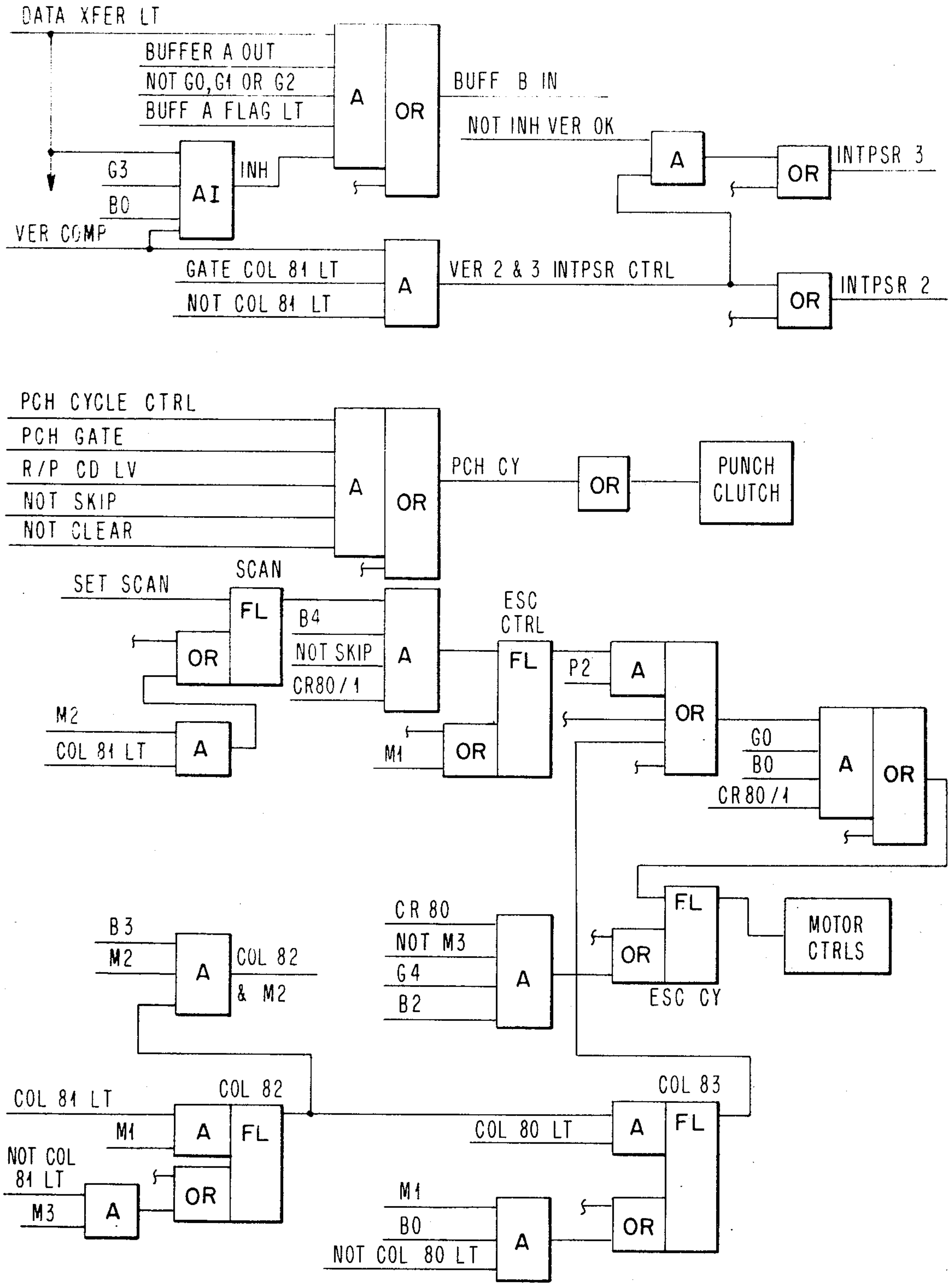

Referring to FIGS. 4*b*, 9*a*, 9*b* and 10*b* while a card is stopped in column 80 punch position (in VER RD mode) the operator keys the information remaining to be verified [80–(*x*–1) columns in VER RD Mode; 80 columns in VER mode] for comparison to the information stored in respective remaining locations of buffer A. Assuming still that verify error has not been detected in any keying the punch interposers and punch escape controls are brought into operation (FIGS. 8*a*, 9*b*) at completion of the 80th key entry (after coincidence of COMPARE/Enter Gate and CR80/1). Next, punch timing functions (P) of which only P2 (FIGS. 8*b*, 9*b*) is of interest, are brought up in sequence. The function P2 controls setting of ESC CY while ESC CNTRL is set (FIGS. 8*b*, 9*b*). In the first P2 interval the card is FWD stepped to col. 81 punch position while the punch interposers are being set to perform a 2–3 (Verify OK) punch. Assuming that the 80 th key entry is verified to be correct the 2–3 "OK" punch is made in col. 81 and the card is escaped further and advanced to the stacker as indicated in FIG. 9*b*.

VERIFY ERROR HANDLING (FIG. 7)

Figure 14:
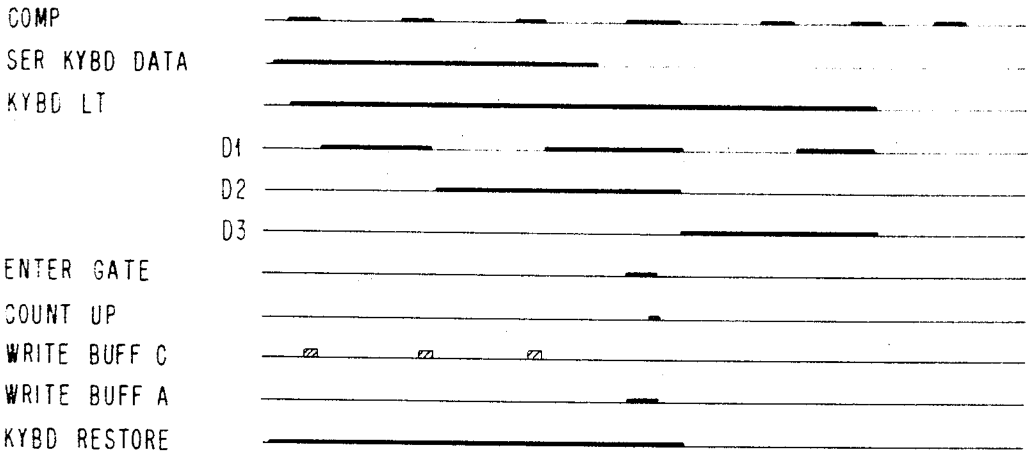
Figure 15:
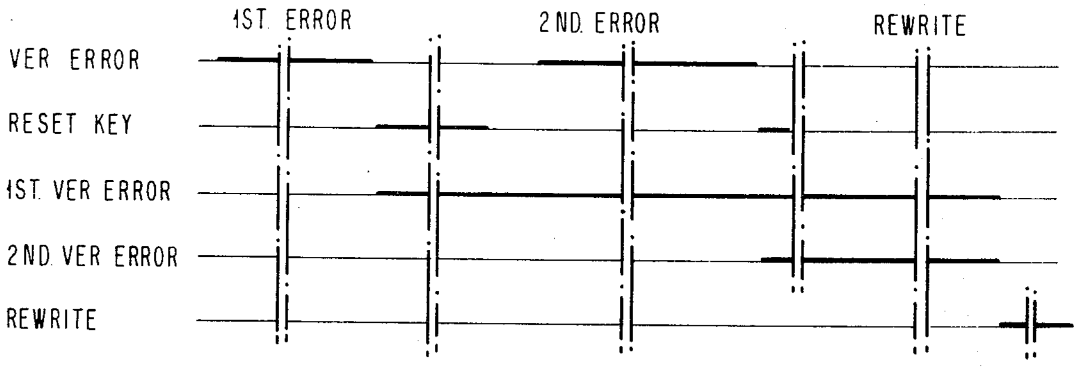

If during verification keying (before or after the 11–0 VER RD INTR escapement interruption) verification error is indicated by setting of Verify Error Latch (VER ERR LT, FIG. 7), the Verify Error panel light indication is lit to alert the key operator, the keys are blocked and the Count Up input to C Counter (FIG. 6) is suppressed. This leaves the key system disabled (FIG. 14). When Verify Reset key is operated the Verify Error light goes out and the keyboard is allowed to be active. Also VER ERR LT is reset.

Upon resetting of VER ERR LT after a first error the "1st Verify Error" trigger is set. Information is rekeyed, rewritten into the same column sector of buffer C and re-compared with buffer A at COMPARE/Enter Gate Time. If no error is found the Count Up is completed, 1st Verify Error trigger is reset and normal keying of successive characters is resumed.

If an error is detected following rekeying after 1st Verify Error has been set, the same error conditions are set as above. Upon operation of Verify Reset key, resetting VER ERR latch, 2nd Verify Error trigger is set and the system is reset to allow next keystroke which will be a re-write keystroke.

On the next keystroke, the data is transferred from buffer C to buffer A at Enter Gate time (see input to Write buffer A line of FIG. 7), in effect correcting the erroneous card punch information in buffer A, and subsequently the 1st and 2nd Verify Error triggers are reset. Also, Verify OK LT is set (FIG. 8*a*).

At this time depending upon program conditions, Force Re-verify Latch (FIG. 7) is set. Force Re-verify latch prevents further keying until the operator presses a character backspace key (decrementing the C Count) and rekeys the corrected information. The information is force re-verified, by comparison to the corrected content of buffer A, and assuming no error normal verification keying is permitted to resume (if error occurs this time the entire re-keying procedure above must be repeated).

Set condition of Inhibit Verify OK Latch (FIG. 8*a*) prepares setting logic of Verify Rewrite Conrol Latch (FIG. 8a) so that the latter latch is set when the card arrives subsequently at column 80 punch position. Inhibit Verify OK also disables the OK punch position. Inhibit Verify OK also disables the OK punch controls (FIG. 8*b*). Verify Rewrite Control prepares input setting logic of ESC CY LT (FIG. 8*b*) to provide for card escapement out underneath feed wheel after completion of verification keying, without OK punching.

Verify Rewrite Control and Inhibit Verify OK prepares not shown controls to inhibit further VER RD Mode processing until operator inserts a blank substitute card into the station and operates a blank substitute card into the station and operates not shown VER Correct key causing the card to be punched from the corrected fully verified information in buffer A.

We have shown and descried above the fundamental novel features of the invention as applied to a preferred embodiment. It will be understood that various omissions, substitutions and changes in form and detail of the invention as described herein may be made by those skilled in the art without departing from the true spirit and scope of the invention. It is the intention therefore to be limited only by the scope of the following claims.

What is claimed is:

1. In a buffered keypunch card processing system including: a card processing station having an obstructive cover, a keyboard, an electronic buffer store and means for automatically stepping cards through said station in coordination with operations of said store, the improvement for dual card processing which comprises:

means for pre-loading program information into said buffer store for use subsequently to inhibit operation of said stepping means selectively in respect to dual cards as said dual cards arrive at selected column processing positions relative to said station; each said selected position being associated with the position of respective source information on said dual cards;

means controlled by said pre-loaded program information as said cards arrive at said selected positions to inhibit operation of said stepping means;

and means effective upon operation of said inhibiting means to conditionally restore said stepping means to automatic operation, by disabling said inhibiting means upon completion of a predetermined number of information keying operations at said keyboard in respect to respective source information on the card which is then being processed, said respective source information being subject to unobstructed viewing during respective keying operations while the respective cards are situated in respective said selected positions and being subject at other times to obstruction by said station cover.

2. In a buffered-keypunch card processing system including: a composite Punch/Read card processing station having an obstructive cover, an electronic buffer store, a keyboard for manual information entry relative to said store, and escape control means operative to step cards automatically in column increments of movement in relation to said station, the improvement for dual card processing which comprises:

means for pre-loading a program of escape interruption control information into select program column spaces of said buffer store having discrete association with respective select source information and record column spaces of dual cards to be processed relative to said station;

means operative subsequent to said pre-loading of said program information to control said escape control means to move a said dual card automatically through said station while concurrently permitting processing operations to be performed relative to said card at said station;

means responsive to said program information in said select column spaces of said store as said respective information column spaces of a said dual card arrive in processing position relative to said station for inhibiting operation of said means controlling said escape control means thereby halting said automatic card movement and means operative upon operation of said inhibiting means to thereafter disable said inhibiting means and thereby restore automatic movement of said card conditionally upon perfornace of a predetermined number of manual keying operations at said keyboard in respect to source information of predetermined format on said card which is then visible to the key operator but subject at other times to being obscured by said station cover.

3. In a card processing system including a card processing station for column-wise processing of cards, said station having an obstructive cover, an escape control and processing system for moving cards automatically through said station in column increments while concurrently conducting an information transfer process relative to said cards, a keyboard and a source of program control information coordinated with said escape movement, the improvement for dual card processing comprising:

means bistably conditionable to control selective enablement and disablement of said escape control system during automatic processing of dual cards relative to said station;

means for conditioning said controlling means initially to said enablement controlling condition to permit automatic initial movement of said dual cards relative to said station and automatic processing of information relative to an initial group of columns of each said card;

means responsive to program control information selectively issued by said source in coincidence with situation of a said dual card at an associated select column processing position relative to said station to condition said controlling means to disablement controlling condition; and means coupled to said keyboard and processing system for re-conditioning said controlling means to enablement controlling condition only after completion of a plurality of keying operations relating to source information on said card which is then both immediately requisite to the continued processing of said card and visible to the keying operator but subject to being immediately obscured by said cover if said card movement is continued.

4. In a buffered keypunch card processing system — which includes a composite punch/read card processing station, a keyboard, a buffer store, an escape control and read/store processing system for automatically moving cards relative to said station in column increments while read-sensing successive punch information columns of said cards intermediate consecutive movements and storing said sensed information in said buffer store during successive movement — the improvement for verification read processing of pre-punched dual cards comprising:

means settable to enabling and disabling states for respectively enabling and disabling said escape control and read store processing system;

means for setting said enabling/disabling means initially to said enabling state to permit automatic initial escape movement and initial read/store processing of a said dual card;

means for lookahead scanning siad buffer store for program information in a column sector corresponding to the card column to be next processed while storing the sensed information of a preceding card column; said scanning means responsive to occurrence of particular program information in said scanned sector to condition said enabling/disabling means to disabling state upon completion of read-storage processing of said preceding card column;

means coupled to said keyboard and buffer store for storing keyed information in said store and for verifying said stored keyed information by comparison to respective card sensed information placed in said store during said initial read-store processing; and means responsive to completion of verification of said stored card information for re-conditioning said enabling/disabling means to enabling state, thereby permitting continued operation of said escape conrol and read-store processing systems, in turn permitting completion of processing and verification of the remainder of said dual card.

5. A dual card verification system according to claim 4 wherein said program information disabling said enabling/disabling means is selected to position said card during said disablement in a position at which source information on said card required for said verification keying operations is viewable without obstruction from said station, said source information being subject to obstruction upon further forward escape movement of aid card in said station.

6. In a buffered keypunch card processing system including a keybaord, a composite punch/read card processing station, an escape control system for positioning cards relative to said station, a buffer store including column storage sectors containing space for storage of pre-loaded program information, flag information, card information for a current process and keyed information, a read processing system for transferring read-sensed information from successive columns of pre-punched said cards to successive column sectors of said store — said read processing system including means for initially storing read flags in all of said flag spaces of said successive column sectors of said store during feed-in alignment of a said card in said station, means for scanning successive said column sectors for flags to locate respective said column sectors as storage sites for successive columns of said read-sensed card information and means for erasing said scanned flags as read-sensed information is stored in respective said column sectors — the improvement for read-verification processing of dual cards comprising:

initially inoperable means conditionable to control disablement of said escape control and read processing systems;

first lookahead scan means controlled by said read flag scanning means of said read processing system for scanning one column sector in advance of each said erased read flag for program interrupt information of predetermined form selectively prestored in said advance sector; said program scanning means being responsive to said interrupt information to condition said disablement control means from inoperable to operable status, thereby halting operation of said escape and processing systems upon scanning a said advance sector containing such interrupt program information and thereby halting said dual card in an intermediate processing position in said station with a respective advance column of said card corresponding to said advance-scanned sector positioned for read-sensing;

counting means;

verifying means enabled by operation of said read processing system and keyboard to verify previously read-sensed columns of card information stored in successive column sectors of said store located by reference to a count indication manifested by said counting means and to increment said counting means indication upon completion of each successful verification; and means controlled by said counting means to recondition said disablement controlling means from operative to inoperative status upon completion of a number of successful verifications coresponding to the number of column sectors of card-sensed information stored prior to conditioning of said controlling means to operative status.

7. Improved buffer keypunch apparatus according to claim 6 wherein said re-conditioning means includes:

second lookahead means controlled by said counting means for scanning respective advance column sectors of said store for presence of a said read flag and upon location of the first such operative to initiate said re-conditioning.

8. Improved apparatus according to claim 7 including:

means coupled to said verifying means for preventing incrementing of said counting means upon detection of verification error.

* * * * *